(12) United States Patent
Hirokawa et al.

(10) Patent No.: US 11,325,847 B2
(45) Date of Patent: May 10, 2022

(54) ADSORPTION METHOD

(71) Applicants: TAKAHASHI METAL INDUSTRIES CO., LTD., Nagahama (JP); NIPPON SODA CO., LTD., Tokyo (JP)

(72) Inventors: Toshiyasu Hirokawa, Nagahama (JP); Tsuyoshi Noishiki, Nagahama (JP); Nobuo Kimura, Tokyo (JP); Yuichi Tateishi, Chihara (JP); Yukiko Takahashi, Chihara (JP)

(73) Assignees: TAKAHASHI METAL INDUSTRIES CO., LTD., Nagahama (JP); NIPPON SODA CO., LTD., Tokyo (JP)

( * ) Notice: Subject to any disclaimer, the term of this patent is extended or adjusted under 35 U.S.C. 154(b) by 230 days.

(21) Appl. No.: 16/621,365

(22) PCT Filed: Jun. 11, 2018

(86) PCT No.: PCT/JP2018/022183
§ 371 (c)(1),
(2) Date: Dec. 11, 2019

(87) PCT Pub. No.: WO2018/230489
PCT Pub. Date: Dec. 20, 2018

(65) Prior Publication Data
US 2021/0139347 A1 May 13, 2021

(30) Foreign Application Priority Data
Jun. 16, 2017 (JP) .............................. JP2017-118425

(51) Int. Cl.
| | |
|---|---|
| *C02F 1/28* | (2006.01) |
| *B01J 20/06* | (2006.01) |
| *B01J 20/34* | (2006.01) |
| C02F 101/10 | (2006.01) |
| C02F 101/16 | (2006.01) |

(52) U.S. Cl.
CPC .............. *C02F 1/281* (2013.01); *B01J 20/06* (2013.01); *B01J 20/34* (2013.01); *C02F 2101/101* (2013.01); *C02F 2101/163* (2013.01); *C02F 2303/16* (2013.01)

(58) Field of Classification Search
CPC ..... C02F 1/281; C02F 1/28; C02F 1/58; B01J 20/06; B01J 20/34; C01G 49/02
See application file for complete search history.

(56) References Cited

U.S. PATENT DOCUMENTS

| | | |
|---|---|---|
| 2006/0019820 A1 | 1/2006 | Nakano et al. |
| 2009/0028770 A1 | 1/2009 | Mae et al. |
| 2017/0015568 A1 | 1/2017 | Mallmann et al. |

FOREIGN PATENT DOCUMENTS

| | | | |
|---|---|---|---|
| CN | 1863591 A | 11/2006 | |
| EP | 1736236 A1 * | 12/2006 | ......... B01J 20/3071 |
| JP | S52-065973 A | 5/1977 | |
| JP | 2006-124239 A | 5/2006 | |
| JP | 2006-130420 A | 5/2006 | |
| JP | 2006-305551 A | 11/2006 | |
| JP | 2011-235222 A | 11/2011 | |
| JP | 2011-255341 A | 12/2011 | |
| TW | 201716128 A | 5/2017 | |
| WO | 2006/011191 A1 | 2/2006 | |
| WO | 2006/088083 A1 | 8/2006 | |
| WO | 2009/063456 A1 | 5/2009 | |
| WO | 2017/061118 A1 | 4/2017 | |

OTHER PUBLICATIONS

Bacelo et al., "Performance and prospects of different adsorbents for phosphorus uptake and recovery from water," Chemical Engineering Journal, 2020, vol. 381, 122566, pp. 1-18.
Apr. 3, 2019 Office Action issued in Taiwanese Patent Application No. 107120340.
Aug. 21, 2018 International Search Report issued in International Patent Application No. PCT/JP2018/022183.

* cited by examiner

*Primary Examiner* — Chester T Barry
(74) *Attorney, Agent, or Firm* — Oliff PLC

(57) ABSTRACT

A method of selectively and efficiently adsorbing an anion such as a phosphate ion which adversely affect the environment when discharged without any treatment, or an anion which can be used beneficially when recovered, from waste water or a solution including such ion using an adsorbent. A method of adsorbing an anion of interest from an aqueous solution (A) containing the anion of interest and the other anion using an anion adsorbent, including performing at least (1) a step of contacting the aqueous solution (A) having a pH of 5.8 or less with the anion adsorbent to allow the anions to be adsorbed to the anion adsorbent, and then (2) a step of contacting water or an aqueous solution (B) having a pH of 5.2 to 11 with the anion adsorbent to desorb at least a part of the other anion adsorbed to the anion adsorbent from the anion adsorbent.

10 Claims, No Drawings

ADSORPTION METHOD

TECHNICAL FIELD

The present invention relates to an adsorption method of an anion using an adsorbent.

BACKGROUND ART

For the purpose of removing materials harmful to an environment and a human body from various waste water and purifying the waste water, or for the purpose of recovering useful materials such as a rare metal, active studies have been made on an adsorbent and an adsorption method using thereof, and a method of desorption and recovery of an adsorbate.

For example, although phosphorus is an essential component as a fertilizer component and for chemical industry, almost 100% of phosphorus depends on imports in Japan. On the other hand, when a large amount of phosphorus is comprised in waste water, it causes eutrophication, and thus discharging of such waste water is not preferable for an environment. In order to solve these problems, removal and recovery of phosphorus compounds such as phosphate comprised in waste water are attracting attention.

As an adsorbent capable of efficiently adsorbing and recovering anions such as a phosphate ion, an adsorbent comprising iron oxyhydroxide (FeOOH) has been developed, and is described in Patent Documents 1, 2, 3, 4 etc. In particular, Patent Document 2 describes selective adsorption of a phosphate ion. Patent Document 5 describes a method in which phosphorus is adsorbed from water comprising large amount of various components to a metal oxide-based adsorbent, desorbed by an aqueous alkaline solution, and precipitated as calcium phosphate to be recovered. However, in addition, a more efficient method of recovering phosphorus is desired.

CITATION LIST

Patent Documents

Patent Document 1
Japanese Patent Laid-Open No. 2006-124239
Patent Document 2
WO 2006/088083
Patent Document 3
Japanese Patent Laid-Open No. 2011-235222
Patent Document 4
Japanese Patent Laid-Open No. 2006-305551
Patent Document 5
Japanese Patent Laid-Open No. 2011-255341

SUMMARY OF THE INVENTION

Object to be Solved by the Invention

The object of the present invention is to solve the above problems, for example, to provide a method of selectively and efficiently adsorbing an anion such as a phosphate ion which adversely affect the environment when discharged without any treatment, or an anion which can be used beneficially when recovered, from waste water or a solution comprising such ion using an adsorbent.

Means to Solve the Object

Prior to the present invention, the present inventors obtained an adsorbent which exhibit high adsorption efficiency for in particular a phosphate ion. However, such adsorbent also adsorbs anions other than a phosphate ion. In particular, sewage may contain large amount of sulfate ion etc., and it is necessary to recover a phosphate ion in high purity from the sewage. Therefore the present inventors engaged in diligent study to provide a method of selectively recovering a phosphate ion using the adsorbent, and found conditions which achieve such method. The present invention was completed based on such findings.

Specifically, the present invention relates to the following inventions.

[1] A method of adsorbing an anion of interest from an aqueous solution (A) containing the anion of interest and the other anion using an anion adsorbent, comprising performing at least the two following steps: (1) a step of contacting the aqueous solution (A) having a pH of 5.8 or less with the anion adsorbent to allow the anion to be adsorbed to the anion adsorbent, and then (2) a step of contacting water or an aqueous solution (B) having a pH of 5.2 to 11 with the anion adsorbent to desorb at least a part of the other anion adsorbed to the anion adsorbent from the anion adsorbent.

[2] The method according to above [1], wherein the aqueous solution (B) contains the anion of interest.

[3] The method according to above [2], wherein a concentration of the anion of interest in the aqueous solution (B) is 5 ppm or more.

[4] The method according to any one of above [1] to [3], further comprising performing after step (2), (3) a step of contacting an aqueous solution (C) having a pH of 11.5 or more with the anion adsorbent to desorb the anion of interest from the anion adsorbent into the aqueous solution (C).

[5] The method according to above [4], further comprising performing after step (3), (4) a step of regenerating the anion adsorbent, wherein steps (1) to (4) are performed repeatedly.

[6] The method according to above [5], wherein step (4) is a step of contacting an aqueous solution (D) having a pH of 2 to 5 with the anion adsorbent.

[7] The method according to any one of above [1] to [6], wherein the anion of interest is at least one selected from a phosphate ion, a phosphite ion, a hypophosphite ion, an arsenate ion, an arsenite ion, a fluoride ion, a selenate ion, an iodide ion and an iodate ion.

[8] The method according to above [7], wherein the aqueous solution (A) contains at least one selected from a sulfate ion and a nitrate ion as the other anion.

[9] The method according to any one of above [1] to [8], wherein a mass ratio (total amount of the anion of interest)/(total amount of the other anion) in the aqueous solution (A) is 0.01 or more.

[10] The method according to any one of above [1] to [9], wherein the anion adsorbent comprises iron oxyhydroxide as an adsorbing component.

[11] The method according to above [10], wherein the iron oxyhydroxide is β-iron oxyhydroxide.

Effect of the Invention

According to the present invention, it became possible to selectively and efficiently adsorb and recover an anion such as a phosphate ion.

MODE OF CARRYING OUT THE INVENTION

The adsorption method of the present invention is a method of adsorbing an anion of interest from an aqueous solution (A) containing the anion of interest and the other anion using an anion adsorbent, comprising performing at least the two following steps:

(1) a step of contacting the aqueous solution (A) having a pH of 5.8 or less with the anion adsorbent to allow the anions to be adsorbed to the anion adsorbent, and then (2) a step of contacting water or an aqueous solution (B) having a pH of 5.2 to 11 with the anion adsorbent to desorb at least a part of the other anion adsorbed to the anion adsorbent from the anion adsorbent. This method makes it possible to selectively adsorb the anion of interest and reduce the amount of the other anion adsorbed. Herein, "the other anion" refers to an anion or anions other than the anion of interest contained in the aqueous solution (A).

The anion specifically described in the present invention encompasses anions which is variable reversibly depending on the pH conditions. For example, "phosphate ion" (orthophosphate ion) encompasses a phosphate ion ($PO_4^{3-}$) in a narrow sense, a hydrogen phosphate ion ($HPO_4^{2-}$) and a dihydrogen phosphate ion ($H_2PO_4^-$).

The method is not limited to those in which both steps (1) and (2) are each performed only once. For example, when two or more solutions are intended as aqueous solutions (A), two or more steps (1) may be performed each of which is intended for each aqueous solution, then step (2) may be performed. Furthermore, for example, in the case of the "at least a part of the other anion" adversely affecting the adsorption efficiency of the anion of interest, for example, a series of steps comprising of both (1) and (2) can be repeatedly performed. By using this method, it is possible to selectively concentrate and adsorb the anion of interest. Furthermore, as step (2) for example, it is possible to perform two or more steps including conditions for selectively desorbing only a specific anion.

In step (1), the aqueous solution (A) having a pH of 5.8 or less is used. The aqueous solution (A) is not particularly limited, and the pH of the aqueous solution (A) may be adjusted to 5.8 or less by previously adding an acid when the pH is more than 5.8. As an aqueous solution (A), preferably, industrial waste water, sewage, excess sludge derived therefrom and excrement, liquid generated in associated with treatment of dust and incineration ash etc., and in addition, liquid containing harmful substances generated in associated with treatment of industrial wastes and soils can be exemplified.

As an acid used for pH adjustment, various acids can be selected depending on the purpose, but a water soluble inorganic acidic material is preferable, and furthermore, the acid preferably does not contain "at least a part of the other anion" to be desorbed in step (2) in terms of efficiency. The pH of the aqueous solution (A) is preferably 5.5 or less, more preferably 5 or less, even more preferably 1.8 to 4.

The aqueous solution (A) may further contain a suspended solid. When the suspended solids adversely affect adsorption, a step to remove them by filtering using a filter etc. can be added prior to step (1).

The method of contacting the aqueous solution (A) with the anion adsorbent in step (1) is not particularly limited as long as the anion of interest is adsorbed, and either a batchwise method or a flow-through method can be used depending on necessity, and in some cases, two or more methods can be used in combination. As a batchwise method, a method can be exemplified in which the aqueous solution (A) and the adsorbent are mixed and stirred for a certain time, then the adsorbent is removed and recovered to proceed to the next step. As a flow-through method, a method can be exemplified in which an adsorbent is filled into a column and the aqueous solution (A) is flowed through the column as a descending flow or an ascending flow. This method is suitable for conducting a high efficient treatment in a simple facility. A method in which an adsorbent is filled into a container and an aqueous solution (A) is flowed therethrough as an ascending flow so that the adsorbent forms a fluidized bed can be also exemplified. This method is suitable in that there is no concern about clogging of a flow passage when the aqueous solution (A) comprises suspended solid.

In step (2), water or an aqueous solution (B) having a pH of 5.2 to 11 is used. (B) may be water, in particular not containing additives, such as tap water, rainwater, groundwater, pure water and distilled water as long as the pH of (B) is within the above range, but an aqueous solution obtained by dissolving a buffer agent and a trace amount of alkaline material in water to adjust the pH is preferable. The pH of (B) is preferably higher than the pH of (A), more preferably higher than (A) by 0.5 or more, even more preferably by 1 or more. Furthermore, the pH of (B) is preferably within the range of 5.5 to 10, more preferably within the range of 6.5 to 9.5, even more preferably within the range of 7 to 9.5, even more preferably within the range of 8 to 9.5.

In step (2), the method of contacting water or an aqueous solution (B) with the anion adsorbent is not particularly limited as long as at least a part of the other anion is desorbed from the anion adsorbent, and a similar method to that exemplified for the above step (1) can be exemplified.

When a batchwise method is used in steps (1) and (2), as an aqueous solution (B), an aqueous solution (A) without any treatment can be used, or if necessary, the pH of an aqueous solution (A) may be adjusted to be used. It is also possible to adjust the pH by adding a pH adjusting agent such as an alkaline material to an aqueous solution (A) in which an adsorbent is mixed, and to desorb at least a part of the other anion into the solution.

In step (2), when the method is used in which an adsorbent is filled into a column and an aqueous solution (B) is flowed therethrough as a descending flow or an ascending flow, the pH of (B) is preferably within the range of 7 to 9.5, more preferably within the range of 8 to 9.

The water or the aqueous solution (B) is preferably an aqueous solution containing the anion of interest. The reason is that desorption of the other anion from the anion adsorbent is facilitated by the anion of interest, though the mechanism of that is not entirely clear. That makes it possible to almost completely desorb the other anion adsorbed to the anion adsorbent, and in addition, to prevent desorption of the anion of interest in step (2), or to allow the anion of interest to be adsorbed also in step (2).

On the other hand, presence or absence of the other anion in the aqueous solution (B) does not affect the above effects.

The concentration of the anion of interest in the aqueous solution (B) is preferably 5 ppm or more, more preferably 50 ppm or more, even more preferably 100 ppm or more, even more preferably 500 ppm or more. When the concentration is higher, the speed of desorption of at least a part of the other anion from the anion adsorbent is enhanced, and as a result, the required time of step (2) can be reduced. The upper limit of the concentration of the anion of interest is not particularly limited as long as it does not inhibit desorption of the other anion, but preferably 10000 ppm or less.

The aqueous solution (B) can be repeatedly used in two or more steps (2) even after being used for step (2), as long as there is no problem such as the case in which pH is within an inappropriate range, the case in which the concentration of the other anion is too high and precipitation can be caused, and the case in which the anion of interest is adsorbed and does not exist and the above effect is lost.

In steps (1) and (2), the anion of interest contained in the aqueous solutions (A) and (B) may be not completely adsorbed and may remain in the aqueous solution. In that case, the pH of each aqueous solution after treatment is adjusted, if necessary, to be within the suitable pH range for the aqueous solution (A), and then the aqueous solution is contacted with the anion adsorbent again (corresponding to step (1)), and thus the anion of interest can be completely adsorbed.

The thus obtained aqueous solution which does not contain the anion of interest can be transferred to another necessary treatment step, or disposed of without further treatment if there is no problem with respect to environment and safety.

After the step (2), a step of desorption is preferably further added in order to recover the anion of interest. As this step, (3) a step of contacting an aqueous solution (C) having a pH of 11.5 or more with the anion adsorbent to desorb the anion of interest from the anion adsorbent into the aqueous solution (C) is preferable.

The pH of the aqueous solution (C) is preferably 13 or more, more preferably pH 13 to 14. The aqueous solution (C) is preferably a solution obtained by dissolving a water-soluble alkaline material in water. As a water-soluble alkaline material, alkali metal hydroxides such as sodium hydroxide and potassium hydroxide; alkaline earth metal hydroxides such as magnesium hydroxide and calcium hydroxide; aqueous ammonia etc. are exemplified, and among these, alkali metal hydroxides are preferable.

Depending on the type of the adsorbent, it is preferable that (4) a step of regenerating the anion adsorbent is further performed after step (3), and steps (1) to (4) are performed repeatedly. That makes it possible to recover the anion of interest with high efficiency without consuming the anion adsorbent in large amount.

In step (4), acidic aqueous solution (D) is preferably contacted with the anion adsorbent to be used as a regenerating solution. This regenerating solution has preferably a pH of 2 to 5. The water-soluble acidic material used for the regenerating solution can be selected depending on the type of the anion adsorbent, anion of interest, and the type of anion to be desorbed in step (2), but hydrochloric acid is preferably exemplified which is applicable in many cases.

The anion of interest in the present invention is preferably an anion which is harmful to humans and animals or an environment, or an anion which is useful as a resource and required to be recovered. Specifically, a fluoride ion, anions comprising arsenic such as an arsenate ion and an arsenite ion, anions comprising phosphorus such as a phosphate ion, a phosphite ion and a hypophosphite ion, a selenate ion, an iodide ion and an iodate ion are preferable. In particular, the anions comprising phosphorus are contained in sewage etc. in large amount and required to be recovered, and thus preferable for the purpose. Among these, phosphate ion is preferable.

In step (2), anions other than the anion of interest are desorbed. In particular anions incompatible with the purpose of adsorption and/or recovery of the anion of interest, specifically, anions which have to be desorbed are desorbed, such as anions which adversely affect the adsorption efficiency of the anion of interest, or anions which are preferably not coexistent with the anion of interest after desorption and recovery of the anion of interest.

As these anions which have to be desorbed, specifically, a sulfate ion and a nitrate ion can be exemplified.

In particular, in sewage or liquid generated in associated with treatment thereof, a sulfate ion may be contained in large amount. When the anion of interest is an anion including phosphorus such as a phosphate ion, a sulfate ion is less important as a material to be recovered compared to such an anion, and may interfere with the subsequent step when being coexistent with the recovered phosphate ion. From these facts, a sulfate ion is important as an anion which has to be desorbed in step (2).

Therefore, in the present invention, the mass ratio of (total amount of the anion of interest)/(total amount of the other anion) in the aqueous solution (A) is not particularly limited, but can be at least 0.01 or more, suitably 0.1 or more, more suitably 0.8 or more, particularly preferably 1 or more. The mass ratio of (total amount of the anion of interest)/(total amount of anions to be desorbed) in the aqueous solution (A) is not particularly limited, but can be at least 0.01 or more, suitably 0.1 or more, more suitably 0.8 or more, particularly preferably 1 or more.

The anion of interest desorbed in the above method can be recovered in the form of a solid salt or an aqueous solution of a salt. The form is not particularly limited, and may be selected according to an application.

When the anion of interest is a phosphate ion, specific examples of the recovered form may be solids such as calcium phosphate and ammonium magnesium phosphate, aqueous solutions such as sodium phosphate and potassium phosphate. These phosphate salts obtained in the present invention have high purity, and are suitable for applications such as an industrial material and fertilizer.

The anion adsorbent used in the present invention is not particularly limited, but is preferably a metal oxide-based adsorbent (including metal oxide, metal hydroxide and metal oxyhydroxide) which adsorbs anions, or an adsorbent containing a metal oxide-based adsorbent as an anion-adsorbing component and a binding agent and/or carrier as an auxiliary agent. Specific examples of an adsorbing component include iron oxide, iron hydroxide, iron oxyhydroxide, activated alumina, titanium oxide, zirconium oxide, cerium oxide. Among these, iron oxyhydroxide is preferable.

As a more preferable anion-adsorbing component, $\beta$-iron oxyhydroxide can be exemplified, which is suitable for adsorption/recovery to separate a phosphate ion from a sulfate ion using the present invention.

As $\beta$-iron oxyhydroxide, a dry gel is preferable which is obtained by recovering a precipitate obtained by adding a base to a solution of an Iron (III) compound such as iron (III) chloride while adjusting the pH to 9 or less. More specifically, a dry gel obtained by adjusting the above-mentioned pH to 3 to 6, and an adsorbent obtained by adding a step of contacting the dry gel with water may be exemplified. In particular, a dry gel obtained by setting the total concentration of electrolytes in a solution to 10 mass % or more during recovery of the precipitate; a dry gel in which 90% or more of the volume of crystal particles of $\beta$-iron oxyhydroxide is composed of granular crystals having crystal particle size of 20 nm or less or columnar crystals having width of 10 nm or less and length of 30 nm or less, and in which these crystals can be observed without any coagulation by a transmission electron microscope; an adsorbent formed by adjusting the average particle size of a dry gel to 70 μm or less by pulverization etc.; and the like are preferable. BET specific surface area of $\beta$-iron oxyhydroxide particles is preferably 250 m$^2$/g or more.

EXAMPLES

Next, the present invention will be described in more detail with reference to Examples, but the present invention is not limited to the Examples.

Reference Example of Manufacture 1

To an 0.764 mol/L aqueous solution of iron (III) chloride ($FeCl_3$), 12 mol/L aqueous solution of sodium hydroxide (NaOH) was added dropwise while adjusting the pH to 6 or less at room temperature, and the solution was reacted so that the final amount of NaOH added was $NaOH/FeCl_3$ (moll ratio)=2.83, and thus a particle suspension of iron oxyhydroxide was obtained. The total concentration of iron (III) chloride and sodium hydroxide in the above step was 17.6 mass %.

After filtering the suspension, the residue was dried at 120° C. in the air to obtain iron oxyhydroxide particles (1) containing sodium chloride (NaCl). The content of NaCl in the iron oxyhydroxide particles (1) was 20.5 mass % on average based on 100 of iron oxyhydroxide particles (1).

The iron oxyhydroxide particles (1) were washed with ion-exchanged water and further dried at 120° C. in the air to obtain iron oxyhydroxide particles (2). The content of NaCl in the iron oxyhydroxide particles (2) was 0.5 mass % on average based on 100 of iron oxyhydroxide particles (2).

The thus obtained iron oxyhydroxide particles (2) were classified by a sieve and mass of each fraction was measured, and thus the particle size of 90 mass % or more of particles was 0.1 mm to 5 mm. The crystal structure was confirmed to be β-iron oxyhydroxide, and the average crystallite size was confirmed to be 3 nm by X-ray diffraction.

For the obtained iron oxyhydroxide particles (2), crystallites observed by a transmission electron microscope (TEM) are predominantly granular shape having a size of 5 to 10 nm or columnar shape having a width of 5 to 10 nm and a length of 8 to 20 nm, outlines of crystallites are clear, and coagulation of crystallites with each other was not observed. BET specific surface area was 285 $m^2/g$.

Examples 1-1 and 1-2

Digested sludge recovered from a digestion tank of a sewage treatment plant was subjected to dehydration treatment, filtered to remove SS (suspended solids), and thus dehydrated filtrate was obtained. Hydrochloric acid was added to this liquid to adjust the pH to 3.5 (test liquid A-1).

The contents of phosphorus (derived from phosphate ion) and sulfur (derived from sulfate ion) in the test liquid A were measured by ICP (inductively coupled plasma), and results of phosphorus content of 71 ppm and sulfur content of 86 ppm were obtained.

Each 150 mL of test liquid A-1 was added to each of two beakers, each 0.25 g of particles which were the adsorbent of reference example of manufacture 1 classified into a group of 0.25 mm to 0.5 mm by a sieve were added thereto, then the mixtures were stirred, and adsorption tests were conducted. The liquid were sampled after a specified time, separated from solids by a syringe filter, and the concentrations of phosphorus and sulfur in the solution were analyzed by ICP to calculate the amount adsorbed. At the same time the pH was measured.

Immediately after 24 hours of test time was passed, sodium hydroxide was added to the test liquid A-1 to adjust the pH to 5.41 (test liquid B-1-1: Example 1-1) or to 8.46 (test liquid B-1-2: Example 1-2), then adsorption tests were conducted in a similar way to the above, and after specified time, calculation of amount adsorbed and measurements of pH were conducted.

The results are shown in Table 1.

TABLE 1

| | Results of adsorption tests (batchwise test) for dehydrated filtrate | | | | | | |
|---|---|---|---|---|---|---|---|
| | Example 1-1 | | | Example 1-2 | | | |
| Elapsed time | Solution | Amount adsorbed per unit amount of adsorbent (mg/g) | | Solution | Amount adsorbed per unit amount of adsorbent (mg/g) | | |
| (hour) | pH | Phosphorus | Sulfur | pH | Phosphorus | Sulfur | Note |
| 0 | 3.79 | 0 | 0 | 3.82 | 0 | 0 | Start of adsorption test |
| 24 | 4.41 → 5.41 | 16.8 | 2.3 | 4.27 → 8.46 | 16.7 | 4.2 | Switching of test liquid A-1 → B-1-1/B-1-2 |
| 29 | 5.14 | 17.4 | 0.3 | 8.08 | 17.8 | 0.7 | 5 hours after switching to B-1-1/B-1-2 |

From these results, it was found that a phosphate ion was adsorbed at pH 3.5 and at the same time a sulfate ion was also adsorbed, while a sulfate ion was selectively removed by adjusting the pH to 5.5 or 8.5, and as a result, selective adsorption of phosphate ion was achieved.

Example 2-1

20 g of particles which were the adsorbent of Reference Example 1 classified into a group of 0.25 mm to 0.5 mm by a sieve were filled into a column. The volume of filled particles were 16.2 cubic centimeter.

Potassium dihydrogen phosphate and sodium sulfate were dissolved in ion-exchanged water, and a test liquid A-2 containing 100 ppm of phosphorus and 100 ppm of sulfur was prepared by adjusting the pH to 3.0 by hydrochloric acid.

Furthermore, potassium dihydrogen phosphate and sodium sulfate were dissolved in ion-exchanged water, and a test liquid B-2 containing 100 ppm of phosphorus and 100 ppm of sulfur was prepared by adjusting the pH to 8.5 by sodium hydroxide aqueous solution.

The test liquid A-2 was flowed through the above column from the upper side of the column at a space velocity (SV) of 50 (13.2 mL/min) for 6 hours at room temperature, and then, the test liquid B-2 was flowed through the column at a space velocity (SV) of 15 (4.0 mL/min) for 17 hours. The liquid drained from the lower side of the column was sampled over time, separated from solids by a syringe filter. The concentrations of phosphorus and sulfur in the solution were analyzed by ICP or ion chromatography, and the amounts of phosphorus and sulfur adsorbed per unit amount of the adsorbent were calculated. At the same time the pH was measured. The results are shown in Table 2.

Example 2-2

A test was conducted in a similar way to Example 2-1 except that the test liquid B-3 containing 100 ppm of phosphorus and 1000 ppm of sulfur was prepared by dissolving potassium dihydrogen phosphate and sodium sulfate in ion-exchanged water and adjusting the pH to 8.5 by a sodium hydroxide aqueous solution and used instead of the test liquid B-2. The results are shown in Table 2.

Example 2-3

A test was conducted in a similar way to Example 2-1 except that the test liquid B-4 not containing phosphorus and sulfur was prepared by dissolving sodium hydroxide in ion-exchanged water and adjusting the pH to 8.5 and used instead of the test liquid B-2. The results are shown in Table 2.

Example 2-4

A test was conducted in a similar way to Example 2-1 except that the test liquid B-5 containing 100 ppm of sulfur was prepared by dissolving sodium sulfate in ion-exchanged water and adjusting the pH to 8.5 by a sodium hydroxide aqueous solution and used instead of the test liquid B-2. The results are shown in Table 2.

In particular, when the test liquid B containing a phosphate ion was used, the amount of phosphate ion adsorbed was able to be finally enhanced, and the amount of sulfate ion adsorbed was able to be reduced to nearly 0.

Example 2-5

20 g of particles which were the adsorbent of Reference Example 1 classified into a group of 0.25 mm to 0.5 mm by a sieve were filled into a column in a similar way to Example 2-1. The volume of the filled particles was 16.2 cubic centimeter.

A test liquid A-2 containing 100 ppm of phosphorus and 100 ppm of sulfur was prepared by dissolving potassium dihydrogen phosphate and sodium sulfate in ion-exchanged water and adjusting the pH to 3.0 by hydrochloric acid.

A test liquid B-6 containing 100 ppm of phosphorus was prepared by dissolving potassium dihydrogen phosphate in ion-exchanged water and adjusting the pH to 8.5 by sodium hydroxide aqueous solution.

The test liquid A-2 was flowed through the above column from the upper side of the column at a space velocity (SV) of 50 (13.2 mL/min) for 4 hours at room temperature, and then, the test liquid B-6 was flowed through the column at a space velocity (SV) of 15 (4.0 mL/min) for 17 hours. The liquid drained from the lower side of the column was sampled over time, separated from solids by a syringe filter. The concentrations of phosphorus and sulfur in the solution were analyzed by ICP or ion chromatography, and the amounts of phosphorus and sulfur adsorbed per unit amount of the adsorbent were calculated. The amount of sulfur adsorbed after completion of the test was 0.1 mg/g. The results are shown in Table 3.

TABLE 2

Results of adsorption tests (column test) for test liquids containing mixed phosphorus and sulfur

| Elapsed time | Example 2-1 | | | Example 2-2 | | | Example 2-3 |
|---|---|---|---|---|---|---|---|
| | Test | Amount adsorbed per unit amount of adsorbent (mg/g) | | Test | Amount adsorbed per unit amount of adsorbent (mg/g) | | Test |
| (hour) | liquid | Phosphorus | Sulfur | liquid | Phosphorus | Sulfur | liquid |
| 0 | A-2 | 0 | 0 | A-2 | 0 | 0 | A-2 |
| 6 | A-2 → B-2 | 16.0 | 4.3 | A-2 → B-3 | 16.4 | 4.5 | A-2 → B-4 |
| 23 | B-2 | 17.6 | 0.5 | B-3 | 19.4 | 0.3 | B-4 |

| Elapsed time | Example 2-3 | | Example 2-4 | | | |
|---|---|---|---|---|---|---|
| | Amount adsorbed per unit amount of adsorbent (mg/g) | | Test | Amount adsorbed per unit amount of adsorbent (mg/g) | | |
| (hour) | Phosphorus | Sulfur | liquid | Phosphorus | Sulfur | Note |
| 0 | 0 | 0 | A-2 | 0 | 0 | Start of adsorption test Test liquid A |
| 6 | 15.0 | 3.9 | A-2 → B-5 | 16.7 | 5.5 | Switching of test liquid A liquid → B liquid |
| 23 | 14.8 | 2.8 | B-5 | 15.9 | 4.9 | 17 hours after switching to test liquid B |

As can be seen from these results, by flowing the test liquid B in the latter part of each test, the amount of a sulfate ion adsorbed was able to be gradually reduced while maintaining the amount of phosphate ion adsorbed at a certain level or more.

Example 2-6

A test was conducted in a similar way to Example 2-5 except that the test liquid B-7 containing 500 ppm of phosphorus was prepared by dissolving potassium dihydrogen phosphate in ion-exchanged water and adjusting the pH to 8.5 by a sodium hydroxide aqueous solution and used instead of the test liquid B-6. The results are shown in Table 3. It took 6 hours until the amount of adsorption of sulfur reached 0 mg/g since switching of the test liquid.

Example 2-7

A test was conducted in a similar way to Example 2-5 except that the test liquid B-8 containing 800 ppm of phosphorus was prepared by dissolving potassium dihydrogen phosphate in ion-exchanged water and adjusting the pH to 8.5 by a sodium hydroxide aqueous solution and used instead of the test liquid B-6. The results are shown in Table 3. It took 4.5 hours until the amount of adsorption of sulfur reached 0 mg/g since switching of the test liquid.

Example 2-8

A test was conducted in a similar way to Example 2-5 except that the test liquid B-9 containing 1000 ppm of phosphorus was prepared by dissolving potassium dihydrogen phosphate in ion-exchanged water and adjusting the pH to 8.5 by a sodium hydroxide aqueous solution and used instead of the test liquid B-6. The results are shown in Table 3. It took 2 hours until the amount of adsorption of sulfur reached 0 mg/g since switching of the test liquid.

Example 2-9

A test was conducted in a similar way to Example 2-5 except that the test liquid B-10 containing 1000 ppm of phosphorus was prepared by dissolving potassium dihydrogen phosphate in ion-exchanged water and adjusting the pH to 9.5 by a sodium hydroxide aqueous solution and used instead of the test liquid B-6. The results are shown in Table 3. It took 2 hours until the amount of adsorption of sulfur reached 0 mg/g since switching of the test liquid.

TABLE 3

Results of adsorption tests (column test) for test liquids containing mixed phosphorus and sulfur

| | Example 2-5 | | | Example 2-6 | | |
|---|---|---|---|---|---|---|
| Elapsed time | Test | Amount adsorbed per unit amount of adsorbent (mg/g) | | Test | Amount adsorbed per unit amount of adsorbent (mg/g) | |
| (hour) | liquid | Phosphorus | Sulfur | liquid | Phosphorus | Sulfur |
| 0 | A-2 | 0 | 0 | A-2 | 0 | 0 |
| 4 | A-2→B-6 | 16.0 | 4.3 | A-2→B-7 | 16.4 | 4.5 |
| 6 | B-6 | 13.8 | 4.0 | B-7 | 16.5 | 1.6 |
| 7 | B-6 | 14.4 | 3.3 | B-7 | 17.3 | 0.8 |
| 8.5 | B-6 | 15.4 | 2.5 | B-7 | 17.7 | 0.1 |
| 10 | B-6 | 16.1 | 2.0 | B-7 | 17.2 | 0 |
| 21 | B-6 | 16.3 | 0.1 | | | |

| | Example 2-7 | | | Example 2-8 | | |
|---|---|---|---|---|---|---|
| Elapsed time | Test | Amount adsorbed per unit amount of adsorbent (mg/g) | | Test | Amount adsorbed per unit amount of adsorbent (mg/g) | |
| (hour) | liquid | Phosphorus | Sulfur | liquid | Phosphorus | Sulfur |
| 0 | A-2 | 0 | 0 | A-2 | 0 | 0 |
| 4 | A-2→B-8 | 15.0 | 3.9 | A-2→B-9 | 16.7 | 5.5 |
| 6 | B-8 | 19.2 | 1.6 | B-9 | 17.2 | 0 |
| 7 | B-8 | 21.1 | 0.9 | | | |
| 8.5 | B-8 | 21.1 | 0 | | | |
| 10 | | | | | | |
| 21 | | | | | | |

| | Example 2-9 | | | |
|---|---|---|---|---|
| Elapsed time | Test | Amount adsorbed per unit amount of adsorbent (mg/g) | | |
| (hour) | liquid | Phosphorus | Sulfur | Note |
| 0 | A-2 | 0 | 0 | Start of adsorption test (test liquid A) |
| 4 | A-2→B-10 | 16.7 | 5.5 | Switching of test liquid A liquid → B liquid |
| 6 | B-10 | 18.3 | 0 | 2 hours after switching to test liquid B |
| 7 | | | | 3 hours after switching to test liquid B |
| 8.5 | | | | 4.5 hours after switching to test liquid B |
| 10 | | | | 6 hours after switching to test liquid B |

TABLE 3-continued

Results of adsorption tests (column test) for test liquids containing mixed phosphorus and sulfur

| 21 | 17 hours after switching to test liquid B |
|---|---|

As can be seen from these results, when the concentration of phosphate ion contained in the test liquid B flowed in the latter part of the each test was higher, the time required for reducing the amount of sulfate ion adsorbed to 0 was able to be more reduced.

Examples 3-1, 3-2 and 3-3: Desorption-Recovery Test

Sodium hydroxide was dissolved in ion-exchange water to prepare a 10 mass % solution. The pH was 14. This solution was flowed through the column as test liquid C-1 from the upper side of the column immediately after completing Examples 2-1, 2-3 and 2-4 respectively, at a space velocity (SV) of 20 (5.3 mL/min) for 2 hours at room temperature. The liquid drained from the lower side of the column was recovered, and the concentrations of phosphorus and sulfur in the solution were analyzed by ICP or ion chromatography. The recovered amounts of phosphorus and sulfur desorbed into the recovered test liquid C-1 were calculated from a product of each content and flow volume.

Similarly, the test liquid C-1 was also flowed through the column immediately after completing Examples 2-3 and 2-4 respectively, and the respective recovered test liquid was analyzed and the desorption-recovery amount was calculated. These results are shown in Table 4.

TABLE 4

Results of desorption-recovery test (column test) using test liquid C-1

| Desorption-recovery test Adsorption test | | Example 3-1 Example 2-1 | Example 3-2 Example 2-3 | Example 3-3 Example 2-4 |
|---|---|---|---|---|
| Desorption-recovery amount (mg) | Phosphorus | 334 | 285 | 300 |
| | Sulfur | 6.5 | 67 | 113 |

From these results, it was shown that a phosphate ion adsorbed under the condition of Examples 2-1 to 2-4 was able to be desorbed and recovered. In particular, it can be seen that when a phosphate ion adsorbed under the condition of Example 2-1 is desorbed, phosphate salt having extremely high purity can be easily obtained.

Example 4: Regeneration/Repeating Adsorption Test

10% hydrochloric acid was added to and mixed with ion-exchange water to prepare a pH 2.5 aqueous solution (test liquid D-1). The test liquid D-1 was flowed through the column from the upper side of the column immediately after completing Example 3-3 at a space velocity (SV) of (9.3 mL/min) at room temperature, the pH of the liquid drained from the lower side of the column was measured regularly, and flow of the solution was stopped at the point of time in which pH of the drained liquid reached 2 to 5, and thus anion adsorption performance (adsorption capacity) of the adsorbent was regenerated. Out of the tests described in Example 2-4, the adsorption test under the same condition as the test using the test liquid A-2 was conducted again using this regenerated adsorbent, and almost same values were reproduced with respect to the amount of phosphorus and sulfur adsorbed per unit amount of the adsorbent. These results are shown in Table 5.

TABLE 5

Results of regeneration of adsorbent and repeating adsorption test (column test) using test liquid D-1

| | | Control Test liquid A-2 (in the process of Example 2-4) | Example 4 After terminating flowing test liquid A-2 → B-5 → C-1 (Example 3-3) and then flowing test liquid D-1 → A-2 |
|---|---|---|---|
| Time point of calculation of amount adsorbed | | | |
| Amount adsorbed per unit amount of adsorbent (mg/g) | Phosphorus | 16.7 | 16.1 |
| | Sulfur | 5.5 | 5.4 |

INDUSTRIAL APPLICABILITY

The adsorption method of the present invention is capable of selectively and efficiently adsorbing an anion such as a phosphate ion which adversely affect the environment when discharged without any treatment, or an anion which can be used beneficially when recovered, and thus can be preferably used for removal and recovery from various waste water and reuse of such anion.

The invention claimed is:

1. A method of adsorbing an anion of interest from an aqueous solution (A) containing the anion of interest and another anion using an anion adsorbent, comprising performing at least the two following steps:
    (1) a step of contacting the aqueous solution (A) having a pH of 5.8 or less with the anion adsorbent to allow the anion to be adsorbed to the anion adsorbent, and then
    (2) a step of contacting an aqueous solution (B) containing the anion of interest and having a pH of 5.2 to 11 with the anion adsorbent to desorb at least a part of the other anion adsorbed to the anion adsorbent from the anion adsorbent.

2. The method according to claim 1, wherein a concentration of the anion of interest in the aqueous solution (B) is 5 ppm or more.

3. The method according to claim 1, further comprising performing after step (2),
   (3) a step of contacting an aqueous solution (C) having a pH of 11.5 or more with the anion adsorbent to desorb the anion of interest from the anion adsorbent into the aqueous solution (C).

4. The method according to claim 3, further comprising performing after step (3),
   (4) a step of regenerating the anion adsorbent, wherein steps (1) to (4) are performed repeatedly.

5. The method according to claim 4, wherein step (4) is a step of contacting an aqueous solution (D) having a pH of 2 to 5 with the anion adsorbent.

6. The method according to claim 1, wherein the anion of interest is at least one selected from a phosphate ion, a phosphite ion, a hypophosphite ion, an arsenate ion, an arsenite ion, a fluoride ion, a selenate ion, an iodide ion and an iodate ion.

7. The method according to claim 6, wherein the aqueous solution (A) contains at least one selected from a sulfate ion and a nitrate ion as the other anion.

8. The method according to claim 1, wherein a mass ratio (total amount of the anion of interest)/(total amount of the other anion) in the aqueous solution (A) is 0.01 or more.

9. The method according to claim 1, wherein the anion adsorbent comprises iron oxyhydroxide as an adsorbing component.

10. The method according to claim 9, wherein the iron oxyhydroxide is β-iron oxyhydroxide.

* * * * *